United States Patent
Chaganti et al.

(10) Patent No.: US 10,898,928 B2
(45) Date of Patent: Jan. 26, 2021

(54) VISION AND ANALOG SENSING SCRAP SORTING SYSTEM AND METHOD

(71) Applicant: Huron Valley Steel Corporation, Trenton, MI (US)

(72) Inventors: Kalyani Chaganti, Canton, MI (US); Paul Torek, Ann Arbor, MI (US); Michael A. Hawkins, Belleville, MI (US)

(73) Assignee: Huron Valley Steel Corporation, Trenton, MI (US)

( * ) Notice: Subject to any disclaimer, the term of this patent is extended or adjusted under 35 U.S.C. 154(b) by 18 days.

(21) Appl. No.: 15/936,923

(22) Filed: Mar. 27, 2018

(65) Prior Publication Data
US 2019/0299255 A1 Oct. 3, 2019

(51) Int. Cl.
*B07C 5/342* (2006.01)
*G06K 9/62* (2006.01)
*G06K 9/20* (2006.01)
*B07C 5/36* (2006.01)

(52) U.S. Cl.
CPC .......... *B07C 5/3422* (2013.01); *B07C 5/3425* (2013.01); *G06K 9/2027* (2013.01); *G06K 9/628* (2013.01); *B07C 5/366* (2013.01)

(58) Field of Classification Search
CPC .................. G06K 9/2027; G06K 9/628
See application file for complete search history.

(56) References Cited

U.S. PATENT DOCUMENTS

| | | | |
|---|---|---|---|
| 4,513,868 A * | 4/1985 | Culling | B07C 5/368 209/576 |
| 4,563,644 A | 1/1986 | Lenander et al. | |
| 4,718,559 A | 1/1988 | Kenny et al. | |
| 5,413,222 A | 5/1995 | Holder | |
| 5,520,290 A | 5/1996 | Kumar et al. | |

(Continued)

FOREIGN PATENT DOCUMENTS

WO 2011159269 A1 12/2011

OTHER PUBLICATIONS

Wendt Corporation, Tomra Sorting Solutions, New Generation Finder, Buffalo, NY, May 2015, 3 pages.
(Continued)

*Primary Examiner* — Charles A Fox
*Assistant Examiner* — Kalyanavenkateshware Kumar
(74) *Attorney, Agent, or Firm* — Brooks Kushman P.C.

(57) ABSTRACT

A system and a method of sorting scrap particles is provided. A moving conveyor containing scrap particles is imaged using a vision system to create a vision image corresponding to a timed location of the conveyor, and is sensed using a sensing system to create a sensing matrix corresponding to the timed location. The sensing system has at least one array of analog proximity sensors. A control system analyzes the vision image as a vision matrix of cells, and generates a vision vector containing vision data from the vision matrix for the particle. The control system analyzes the sensing matrix, and generates a sensing data vector containing sensing data from the sensing matrix for the particle. The control system classifies the particle into one of at least two classifications of a material as a function of the vision data vector and the sensing data vector.

20 Claims, 6 Drawing Sheets

(56) References Cited

U.S. PATENT DOCUMENTS

| | | | |
|---|---|---|---|
| 5,676,256 A * | 10/1997 | Kumar | B07C 5/3422 |
| | | | 198/349.1 |
| 7,658,291 B2 | 2/2010 | Valerio | |
| 8,360,242 B2 | 1/2013 | Valerio | |
| 9,119,239 B2 | 8/2015 | Engel-Hall et al. | |
| 9,785,851 B1 | 10/2017 | Torek et al. | |
| 10,207,296 B2 * | 2/2019 | Garcia | B07C 5/3416 |
| 2003/0034281 A1 | 2/2003 | Kumar | |
| 2007/0262000 A1 | 11/2007 | Valerio | |
| 2013/0229510 A1 * | 9/2013 | Killmann | B07C 5/3416 |
| | | | 348/91 |
| 2013/0297251 A1 | 11/2013 | Engel-Hall et al. | |
| 2013/0304254 A1 | 11/2013 | Torek et al. | |

OTHER PUBLICATIONS

U.S. Appl. No. 62/477,589, entitled "System and Method for Sorting Scrap Materials", filed Mar. 28, 2017, 29 pages.
International Search Report and Written Opinion for Application No. PCT/US2019/019790, dated Jun. 14, 2019, 12 pages.

* cited by examiner

VISION AND ANALOG SENSING SCRAP SORTING SYSTEM AND METHOD

TECHNICAL FIELD

Various embodiments relate to a system and method for sorting scrap materials, including scrap materials containing metal, in a line operation.

BACKGROUND

Scrap metals are currently sorted at high speed or high volume using a conveyor belt or other line operations using a variety of techniques including: hand sorting by a line operator, air sorting, vibratory sorting, magnetic sorting, spectroscopic sorting, and the like. The scrap materials are typically shredded before sorting and require sorting to facilitate separation and reuse of materials in the scrap, for example, by sorting based on classification or type of material. By sorting, the scrap materials may be reused instead of going to a landfill or incinerator. Additionally, use of sorted scrap material utilizes less energy and is more environmentally beneficial in comparison to refining virgin feedstock from ore or manufacturing plastic from oil. Sorted scrap materials may be used in place of virgin feedstock by manufacturers if the quality of the sorted material meets a specified standard. The scrap materials may be classified as metals, plastics, and the like, and may also be further classified into types of metals, types of plastics, etc. For example, it may be desirable to classify and sort the scrap material into types of ferrous and non-ferrous metals, heavy metals, high value metals such as copper, nickel or titanium, cast or wrought metals, and other various alloys.

SUMMARY

In an embodiment, a method of sorting scrap particles is provided. A moving conveyor containing scrap particles is imaged using a vision system to create a vision image corresponding to a timed location of the conveyor. A control system is employed to analyze the vision image as a vision matrix of cells, identify cells in the vision matrix containing a particle, and generate a vision vector containing vision data from the vision matrix for the particle. The moving conveyor containing scrap particles is sensed using a sensing system to create a sensing matrix corresponding to the timed location of the conveyor, with the sensing system having at least one array of analog proximity sensors. The control system is employed to analyze the sensing matrix, identify cells in the sensing matrix containing a particle, and generate a sensing data vector containing sensing data from the sensing matrix for the particle. The control system is employed to classify the particle into one of at least two classifications of a material as a function of the vision data vector and the sensing data vector.

In another embodiment, a system for sorting randomly positioned scrap material particles on a moving conveyor is provided. The system has a vision system with an imaging sensor and an illuminated predefined viewing area to image a conveyor passing therethrough at a time interval. The system has a sensor system with an array of analog inductive proximity sensors arranged in a single common plane arranged generally parallel to the conveyor. A control system is configured to receive and process image data acquired from the vision system to identify a scrap particle on the conveyor in the viewing area, analyze the vision data for the particle to form a vision data vector, receive and process sensor data acquired from the sensing system and timed to correspond with the vision data to identify the scrap particle on the conveyor, analyze the sensor data for the particle to form a sensor data vector, and classify the particle into a classification of material using the vision data vector and the sensing data vector.

DETAILED DESCRIPTION

As required, detailed embodiments of the present disclosure are provided herein; however, it is to be understood that the disclosed embodiments are examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
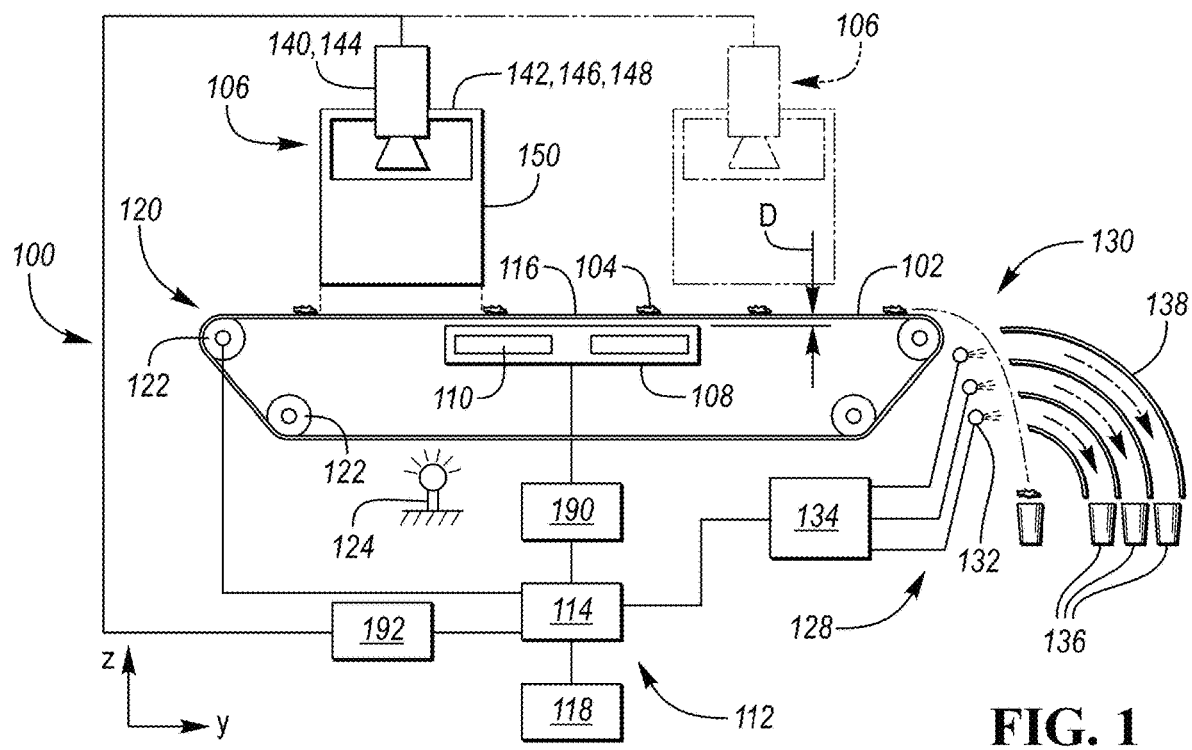
FIG. 1 illustrates a side schematic view of a sorting system according to an embodiment.
Figure 2:
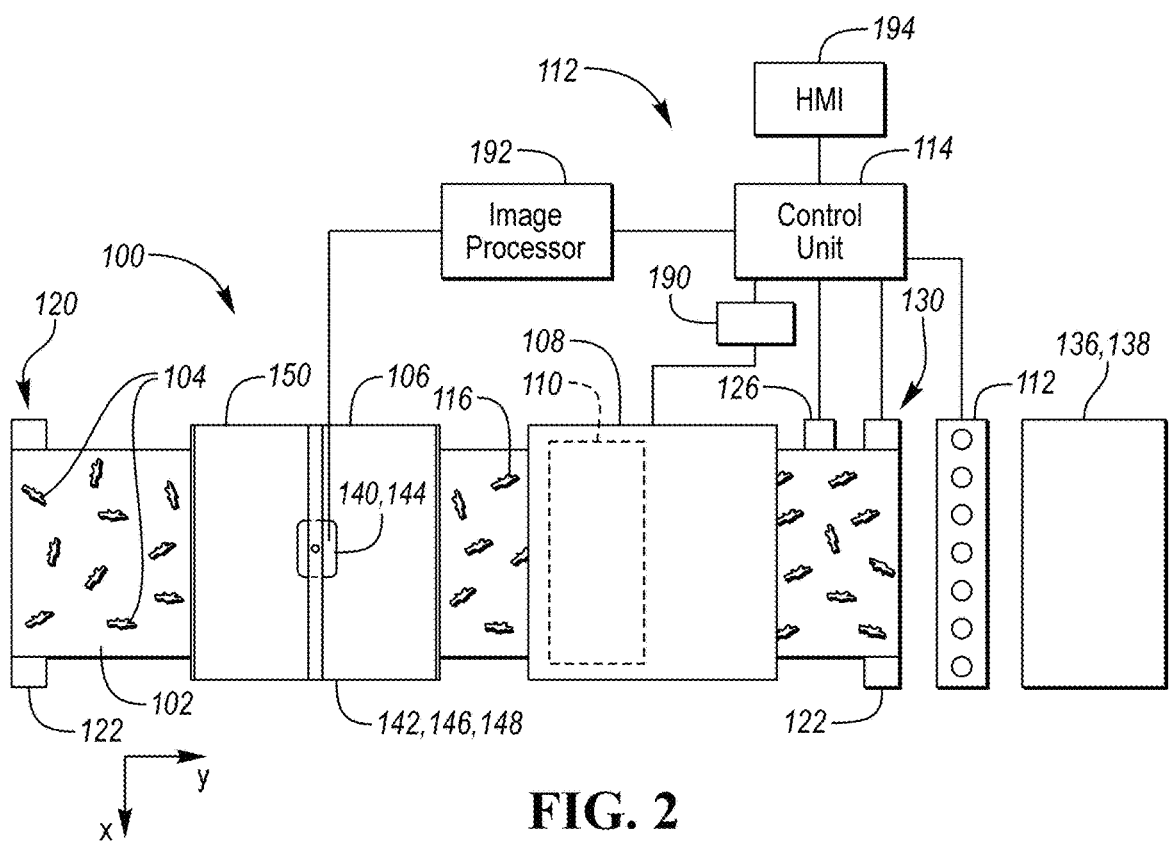
FIG. 2 illustrates a top schematic view of the sorting system of FIG. 1.

FIGS. 1-2 illustrate a system 100 or apparatus for classifying scrap materials into two or more classifications of materials, and then sorting the materials into their assigned classification. In other examples, the system 100 may be used or integrated with other classification and sorting systems, for example, in a larger line operation for classifying and sorting scrap materials.

A conveyor belt 102, or other mechanism for moving objects along a path or in a direction, shown here as the y-direction, supports particles 104 to be sorted. The particles 104 to be sorted are made up of pieces of scrap materials, such as scrap materials from a vehicle, airplane, consumer electronics, a recycling center; or other solid scrap materials as are known in the art. The materials 104 are typically broken up into smaller pieces on the order of centimeters or millimeters by a shredding process, or the like, before going through the sorting system 100 or a larger sorting facility. The particles 104 may be randomly positioned and oriented on the conveyor 102 in a single layer, have random and widely varying shapes, and have varying properties. The particles 104 may include mixed materials. In one example, the scrap material includes wire, and a particle 104 may include wire in various shapes, including three-dimensional shapes. In another example, the particles 104 may include a mixture of cast and wrought materials, such as cast aluminum alloy and wrought aluminum alloy.

The system 100 classifies and sorts the particles 104 into two or more selected categories of materials. In one example, a binary sort is performed to sort the materials 104 into two categories. In another example, the materials are sorted into three or more categories of materials. The conveyor belt 102 extends width-wise and transversely in the x-direction, and pieces or particles of material 104 are positioned at random on the belt 102. In various examples, different scrap materials may be sorted, e.g. metal versus non-metal, types of mixed metals, cast versus wrought, wire versus non-wire, etc.

At least some of the scrap particles 104 may include stainless steel, steel, aluminum, titanium, copper, precious metals including gold, and other metals and metal alloys. The scrap particles 104 may additionally contain certain metal oxides with sufficient electrical conductivity for sensing and sorting. Additionally, the scrap particles 104 may be mixed materials such as metal wire that is coated with a layer of insulation, portions of circuit boards and other electronic waste, scrap materials from tire with metal belt embedded in rubber, and other metals that are at least partially entrapped, encapsulated, or embedded within insulation, rubber, plastics, or other nonconductive materials. The scrap materials 104 may be provided as nonferrous materials that contain other metal and metal alloys. Note that conductive as referred to within this disclosure means that the particle is electrically conductive, or contains metal. Nonconductive as referred to herein means electrically nonconductive, and generally includes plastics, rubber, paper, and other materials having a resistivity greater than approximately one mOhm·cm.

A scrap particle 104 provided by wire may be difficult to detect using other conventional classification and sorting techniques, as it typically has a low mass with a stringy or other convoluted shape and may be coated, which generally provides a barely discernable signal. Alternatively, the scrap particle 104 may be difficult to sort using conventional classification and sorting techniques for similar materials that have been processed using different techniques, such as cast versus wrought materials. The system 100 according to the present disclosure is able to sense and sort these categories of scrap material.

The scrap materials 104 may be shredded or otherwise processed before use with the system 100. Additionally, the scrap materials 104 may be sized, for example, using an air knife or another sizing system prior to use with the system 100. In one example, the scrap particles may be rough sorted prior to use with the system 100, for example, using a system containing digital inductive proximity sensors to classify and separate conductive from nonconductive materials, or using a magnetic sorting system to remove ferrous from non-ferrous materials. The particles 104 may be per-sorted using an eddy current separator or other device to rough sort the materials prior to being sorted into a desired classification by the system 100. Generally, the scrap particles 104 are shredded and sized to have an effective diameter that is similar or on the same order as a sensor end face diameter. The particles 104 are then distributed onto the belt 102 as a single layer of dispersed particles to avoid overlap between particles, and provide separation between adjacent particles for both sensing and sorting purposes. The particles 104 may be dried prior to distribution, sensing, or sorting to improve efficiency and effectiveness of the sorting process.

The particles 104 of scrap material are provided to a first end region 120 of the belt 102. The belt 102 is moved using one or more motors and support rollers 122. A control system 112 including a control unit 114 controls the motor(s) 122 to control the movement and speed of the belt 102.

The belt 102 may pass adjacent to a cleaning system or device 124 shown in FIG. 1. The cleaning system 124 extends across the width of the belt 102 and may include a pressurized air source to remove dust, a wetting device to provide a spray of liquid, e.g. water, onto the surface of the conveyor 102 to clean the conveyor or create a darkened, more uniform surface of the conveyor as the background, and/or other devices such as brushes. The cleaning system 124 may interact with the conveyor 102 prior to the particles being deposited onto the belt, and in some examples, is located along the conveyor return path and beneath the conveyor.

The system 100 has a vision system 106 that images the belt 102 as it passes through a viewing area of the vision system 106. In one example, the vision system 106 provides a color image in the visible spectrum. In other examples, the vision system 106 provides another multi-channel image. The belt 102 passes through the vision system 106, which includes an imaging device 140 to image the material as it moves through the system 106. The vision system 106 creates an image of a region of the belt 102 based on a viewing area of the associated imaging device 140.

The system also has a sensing system 108, or a sensing apparatus 108, that provides sensing data as the belt 102 passes. In one example, and as described below, the sensing apparatus 108 contains one or more arrays of sensors such as analog proximity sensors. In the example shown, one sensor array 110 are shown; however, the system 100 may have a single array 110, or more than two arrays 110. Each array 110 includes a plurality of analog proximity sensors, as described in greater detail below, and the sensors in the array 110 provide an analog signal in response to sensing a particle 104 on the conveyor 102.

The sensors in each array 110 are provided as analog proximity sensors, as opposed to digital sensors. For an analog sensor, the signal output may vary and be any value within a range of values, for example, a voltage range. Conversely, with a digital signal, the signal output may only be provided as a binary signal, e.g. 0 or 1, or as one of a set of discrete, limited values. The sorting and classification system 100 of the present disclosure uses analog sensors to provide greater resolution in the signal. For example, the analog sensor may output a direct current voltage that varies between 0 and 12 Volts, and the signal may be any value within that range, e.g. 4.23 Volts. For a digital sensor, the signal output may be one of two discrete values, for example, that correspond to voltage values on either side of a set threshold value.

The vision system 106 and sensing system 108 are illustrated as being arranged sequentially in the system 100 with particles on the belt 102 passing the vision system 106 prior to the sensing apparatus. In other examples, the vision system 106 may be positioned subsequent to the sensing system 108 along the belt as shown in broken lines in FIG. 1, or the vision system 106 may be positioned directed above the sensing apparatus 108 and located at the same location along the belt 102.

The motors and support rollers 122 are positioned such that the array 110 is directly adjacent to the belt 102 carrying the particles. For example, the belt 102 may be directly positioned between the particles 104 that it supports and an array 110 such that the array 110 is directly underneath a region of the belt 102 carrying particles 104. The motors and support rollers 122 may direct the returning belt below the array 110, such that the array 110 is positioned within the closed loop formed by the belt 102.

The vision system 106 and the sensing system 108 provide vision data and sensing data, respectively, to a control system 112 that uses the vision and sensing data to classify the particles as described below, for example, using a multi-discriminant analysis.

The control system 112 and control unit 114 may include or be in communication with one or more position sensors 126 to determine a location and timing of the belt 102 for use locating and tracking particles 104 as they move through the system on the belt. The position sensor(s) 126 may be provided by a digital encoder, an optical encoder, or the like. In one example, the conveyor 102 is linearly moved at a speed on the order of 200 to 800 feet per minute, although other speeds are contemplated. In a further example, the belt 102 has a linear speed of 300-500 feet per minute, and may have a speed of 400 feet per minute corresponding to a belt movement of 2 millimeters per millisecond, or another similar speed. The speed may be selected to allow sufficient exposure time to the vision and sensor systems while meeting a desired throughput of particles.

The control system 112 uses at least the color data and the sensing data as described below to identify particles 104 on the belt 102 and classify each particle 104 into one of a plurality of classifications. The control system 112 then controls a separator unit 128, using the classification for each particle 104, the location of the particles, and the conveyor belt 102 position to sort and separate the particles 104.

The system 100 includes the separator unit 128 at a second end 130 of the conveyor 102. The separator unit 128 includes a system of ejectors 132 used to separate the particles 104 based on their classification. The separator unit 128 may have a separator controller 134 that is in communication with the control system 112 and the position sensor 126 to selectively activate the appropriate ejectors 132 to separate selected scrap particles 104 located on the conveyor which have reached the discharge end 130 of the belt. The ejectors 132 may be used to sort the particles 104 into two categories, three categories, or any other number of categories of materials. The ejectors 132 may be pneumatic, mechanical, or other as is known in the art. In one example, the ejectors 132 are air nozzles that are selectively activated to direct a jet of air onto selected scrap particles 104 to alter the trajectory of the selected particle as it leaves the conveyor belt so that the particles are selectively directed and sorted into separate bins 136, for example using a splitter box 138.

A recycle loop may also be present in the system 100. If present, the recycle loop takes particles 104 that could not be classified and reroutes them through the system 100 for rescanning and resorting into a category.

The vision system 106 includes the imaging device 140 and a lighting system 142 that the belt 102 and particles 104 pass under. The imaging device 140 may be a camera that has a digital color sensor, such as a charge coupled device (CCD) or complimentary-metal-oxide-semiconductor (CMOS) sensor. In one example, the imaging device 140 is a linescan camera that scans with sufficient frequency to provide a continuous feed of sequential image frames of the conveyor 102, and is a three chip, RGB color CCD camera. In other examples, the imaging device 140 may include a CMOS sensor or another sensor, or may provide an image with using another color model, such as HSV and HSL or other channels. The camera 140 has an associated viewing area that is focused on the belt 102. The camera 140 may be a multispectral or hyperspectral camera providing ultraviolet, visible, and/or infrared channels.

The vision system 106 may additionally or alternatively include a three-dimensional (3-D) imaging device 144 with its own lighting system 146. The 3-D imaging device 144 may be a camera or pair of cameras that views a laser line profile generated by a line laser 148 and uses the vertical displacement of the line laser to determine the top surface profile of the particle 104. In another embodiment, it may be a time-of-flight laser ranging system coupled to a rapid one-dimensional (1-D) scanning mirror that scans the width of the belt 102. Alternatively, a stereo/dual camera 3D system or any other 3D imaging system may be used as is known in the art.

The lighting system 142 illuminates the viewing area of the belt 102 to provide a controlled uniform illumination of the viewing area for the imaging device 140. The lighting system 142 may be provided with a shroud 150 that includes a frame that supports one or more lights emitting broadband visible light, such as fluorescent light bulbs, broadband LEDs or halogen light bulbs. The lighting system 142 may also include a cylindrical lens for collimation and uniform illumination and/or one or more diffuser panels positioned between the lights and the conveyor 102.

The control system 112 controls the vision system 106 using information regarding the position of the conveyor 102, for example, using inputs from the position sensor 126, to determine the linear advancement of the conveyor belt 102 and the associated advancement of the scrap particles 104 on the belt. The control system 112 may control the vision system 106 to acquire an image of the viewing area when the conveyor belt 102 has advanced a distance equal to the length of the viewing area. The imaging device 140 includes an image detector or sensor that electronically records an image of the viewing area through which the scrap particles are conveyed by the conveyor 102.

Figure 3:
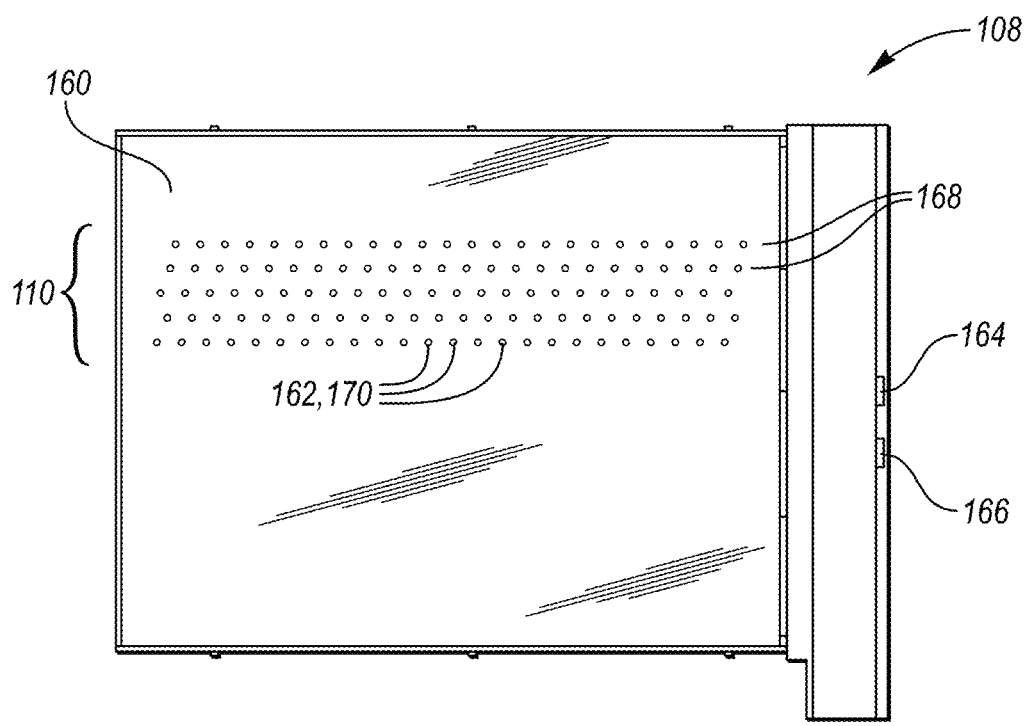
FIG. 3 illustrates a top view of a sensor assembly for use with the sorting system of FIG. 1 according to an embodiment.
Figure 4:
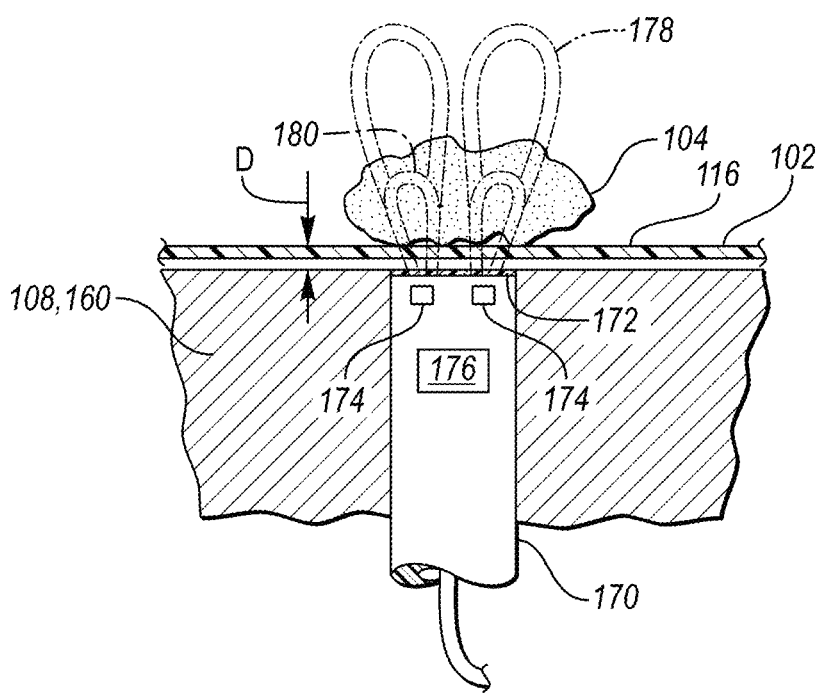
FIG. 4 illustrates a schematic of a sensor interacting with a scrap particle.

FIG. 3 illustrates a top view of a sensing assembly 108 according to an embodiment, and FIG. 4 illustrates a schematic of a sensor in the sensing assembly for use with the system 100 of FIGS. 1-3. The sensing system 108, or the sensing apparatus 108, provides sensing data as the belt 102 passes.

In one example, and as described below, the sensing apparatus 108 contains one or more arrays 110 of sensors such as analog proximity sensors. In the example shown, one sensor array 110 is shown; however, the system 100 may have more than one array 110. Each array 110 includes a plurality of analog proximity sensors, as described in greater detail below, and the sensors in the array 110 provide an analog signal in response to sensing a particle 104 on the conveyor 102.

In the present example, the system 100 uses analog inductive proximity sensors, such that the system is used to sort between two or more classes of metals, as the sensors can only detect electrically conductive materials. Additionally, the system 100 may be used to sort scrap material that includes particles 104 with mixed composition, for example, insulated wire or other coated wire. In various examples, the system 100 is used to sort between at least two of the following groups: metal wire, metal particles, and steel and/or stainless steel, where the metal particles have a conductivity that lies between the wire and steel/stainless steel groups and may include copper, aluminum, and alloys thereof. The system 100 may be used to sort scrap particles 104 having an effective diameter as large as 25 centimeters or more, and as small as 2 millimeters or 22-24 gauge wire. In other examples, the system 100 may be used to sort scrap particles 104 containing metal from scrap particles 104 that do not contain metal.

The sensor array is arranged in a base member 160 that extends transversely across the conveyor belt 102. The base member 160 provides support for and positions an array of sensors. In one example, the base member 160 is provided by a sensor plate that defines an array of apertures 162 that intersect the upper surface, with each aperture sized to receive a corresponding sensor 170 in the array 110 of analog proximity sensors. In other embodiments, other structure or supports may be used to position and fix the sensors into the array in the assembly. The base member 160 provides for cable routing for a power harness 164 to provide electrical power to each of the sensors 170 and also for a data harness 166 to transmit analog signals from each of the sensors 170 to a signal processing unit 190, or sensor processor 190, in the control system 112.

Each sensor has an end surface or active sensing surface 172. The sensors 170 are arranged into an array 110 such that the end surfaces 172 of each of the sensors are co-planar with one another, and lie in a plane that is parallel with the surface 116 of the belt, or generally parallel to the surface of the belt, e.g. within five degrees of one another, or within a reasonable margin of error or tolerance. The end faces 162 of the sensors likewise generally lie in a common plane, e.g. within an acceptable margin of error or tolerance, such as within 5-10% of a sensor end face diameter of one another or less. The sensors 170 are arranged in a series of rows 168 in the array 110, with each row 168 positioned to extend transversely across the sensor assembly 108 and across a belt 102 when the sensor assembly is used with the system 100. Each row 168 in the array 110 may have the same number of sensors 170 as shown, or may have a different number. The sensors 170 in one row 168 are offset from sensors 170 in an adjacent row 168 along a transverse direction as shown to provide sensing coverage of the width of the belt 102. The sensors 170 in the array 110 are arranged such that, in the X-position or transverse direction and ignoring the Y-position, adjacent sensors have overlapping or adjacent electromagnetic fields. The sensors 170 may be spaced to reduce interference or crosstalk between adjacent sensors in the same row 168, and between sensors in adjacent rows 168. In one example, all of the sensors 170 in the array are the same type and size of sensor. In other examples, the sensors 170 in the array may be different sizes, for example, two, three, or more different sizes.

The sensors 170 may be selected based on the size of the active sensing area, or a surface area of the end face 172. The sensors are also selected based on their sensitivity and response rate. In one example, the end face 172 area generally corresponds with or is on the same order as the size of the particles 104 to be sorted, for example, such that the sensor is used to sort particles having a projected area within 50%, 20%, or 10% of the sensor surface area. For example, the sensor end surface 172 area may be in the range of 2 millimeters to 25 millimeters, and in one example is on the order of 12-15 or 15-20 millimeters for use with scrap particles 104 having an effective diameter in the same size range, e.g. within a factor of two or more. Therefore, although the scrap materials 104 may undergo a rough sorting process prior to being distributed onto the belt, the system 100 allows for size variation in the scrap particles. In another example, the end face 172 area may be selected to be smaller than the size of the particles to be sorted, for example, such that the sensor is used to sort particles having a projected area within 200-500% of the sensor surface area. In other examples, the sensor end face area and the size of the particles to be sorted may have another targeted relationship.

The sensors 170 may be selected based on the materials to be sorted. In the present example, the sensors 170 in the array 110 are each inductive analog proximity sensors, for example, for use in detecting and sorting metals. The sensor 170 creates an induction loop as electric current in the sensor generates a magnetic field. The sensor outputs a signal indicative of the voltage flowing in the loop, which changes based on the presence of material 104 in the loop and may also change based on the type or size of metal particles, or for wire versus solid particles. The control system 112 may use the amplitude of the analog voltage signal to classify the material. In further examples, the control system 112 may additionally or alternatively use the rate of change of the analog voltage signal to classify the material. The control system 112 may use at least one of the following as determined from the system 108 to classify a region associated with the particle: a peak voltage, a rate of change of voltage, an average voltage, a sum of the voltages over the area associated with the particle region, an area ratio factor as determined using a particle area divided by a bounding box area, a compactness factor as determined as a function of the particle perimeter and the particle area, and the like.

In the present example, the array 110 includes five rows 168 of sensors 170, with each row having 24 identical analog inductive proximity sensors, with each sensor having an end face diameter of 18 millimeters. The array 110 therefore contains 120 sensors. The sensors 170 in each row 168 are spaced apart from one another by approximately five times the diameter of the sensor to reduce crosstalk and interference between the sensors, and in further examples the sensors 170 are spaced apart by more than five times the diameter of the sensor. The number of sensors 170 in each row is therefore a function of the diameter of the sensor and the length of the row which corresponds to the width of the belt. The number of rows 168 is a function of the width of the belt, the number and size of sensors, and the desired sensing resolution in the system 100. In other examples, the rows may have a greater or fewer number of sensors, and the array may have a greater or fewer number of rows, for example, 10 rows.

In the present example, each row 168 is likewise spaced from an adjacent row by a similar spacing of approximately five times the diameter of the sensor 170, and in further examples the sensors 170 are spaced apart by more than five times the diameter of the sensor. The sensors 170 in one row 168 are offset transversely from the sensors in adjacent rows. The sensors 170 in the array as described provide for a sensor positioned every 12.5 mm transversely across the belt when the sensor 170 positions are projected to a common transverse axis, or x-axis, although the sensors 170 may be at different longitudinal locations in the system 100. The control unit therefore uses a matrix or linescan image with 120 cells in a row to correspond with the sensor arrangement in the array. A scrap particle 104 positioned at random on the belt is likely to travel over and interact with an electromagnetic field of at least two sensors 170 in array. Each sensor 170 has at least one corresponding valve or ejector 132 in the blow bar of the sorting assembly.

The end faces 172 of the sensors in the array lie in a single common plane, or a sensor plane. This plane is parallel to and spaced apart from a plane containing the upper surface 116 of the belt, or a belt plane. The sensor plane is spaced apart from the belt plane by a distance D, for example, less than 5 millimeters, less than 2 millimeters, or one millimeter. Generally, improved sorting performance may be provided by reducing D. The distance D that the sensor plane is spaced apart from the belt plane may be the thickness of the belt 102 with an additional clearance distance to provide for movement of the belt 102 over the sensor array 110.

The sensors 170 in the array 110 may all be operated at the same frequency, such that a measurement of the direct current, analog, voltage amplitude value is used to classify the materials. In other examples, additional information from the sensor 170 may be used, for example, the rate of change of the voltage. As a scrap particle 104 moves along the conveyor belt 102, the particle traverses across the array 110 of sensors. The particle 104 may cross or traverse an electromagnetic field of one or more of the sensors 170 in the array. As the particle 104 enters a sensor electromagnetic field, the electromagnetic field is disturbed. The voltage measured by the sensor 170 changes based on the material or conductivity of the particle, and additionally may change based on the type or mass of material, e.g. wire versus non-wire. As the sensor 170 is an analog sensor, it provides an analog signal with data indicative of a material that the sensor is sensing, e.g. the amplitude of the direct current voltage measured by the sensor 170, that may be used to classify the particle.

As the particles 104 are all supported by and resting on the conveyor belt 102, the scrap particles all rest on a common belt plane that is coplanar with the sensor plane of the sensor array 110. As such, the bottom surface of each particle is equidistant from the sensor array as it passes overhead by the distance D. The scrap particles in the system 100 have a similar size, as provided by a sizing and sorting process; however, there may be differences in the sizes of the scrap particles, as well as in the shapes of the particles such that the upper surface of the particles on the belt may be different distances above the sensor array. The particles therefore may have a thickness, or distance between the bottom surface in contact with the belt and the opposite upper surface that is different between different particles being sorted by the system 100. The scrap particles interact with the sensors in the array to a certain thickness, which corresponds with a penetration depth of the sensor as determined by the sensor size and current.

FIG. 4 illustrates a partial schematic cross-sectional view of a sensor 170 in an array 110 and a particle 104 on a belt 102. As can be seen from the Figure, the upper surface 116 of the belt 102, or belt plane, is a distance D above a sensor plane containing the end face 172 of the sensor 170. The sensor 170 contains an inductive coil 174 made from turns of wire such as copper and an electronics module 176 that contains an electronic oscillator and a capacitor. The sensor 170 receives power from an outside power supply. The inductive coil 174 and the capacitor of the electronics module 176 produce a sine wave oscillation at a frequency that is sustained via the power supply. An electromagnetic field is produced by the oscillation and extends out from the end face 172, or the active surface 172 of the sensor 170. An electromagnetic field that is undisturbed by a conductive particle, e.g. when there is no scrap material on the belt 102, is shown at 178. When a scrap particle 104 containing a conductive material, such as metal, enters the electromagnetic field, some of the oscillation energy transfers into the scrap particle 104 and creates eddy currents. The scrap particle and eddy current result in a power loss or reduction in the sensor 170, and the resulting electromagnetic field 180 has a reduced amplitude. The amplitude, e.g. the voltage, of the sensor 170 is provided as a signal out of the sensor via the output. Note that for an analog sensor, the sensor 170 may continually provide an output signal, for example, as a variable voltage within a range of voltages, that is periodically sampled or acquired by the control system 112.

Referring back to FIGS. 1-2, the control system 112 receives the images from the vision system 106, and uses the images to locate and track particles 104 of material on the belt. The control system 112 uses the imaging data to determine vision data or color data associated with each particle 104 on the belt 102. The control system 112 also uses signals from the sensing apparatus 108 to determine sensing data associated with each particle 104. The control system 112 may use the vision and/or the sensing data to locate and track particles 104 on the belt 102. The control system 112 uses the vision data and the sensing data for use in sorting the particles 104 into two or more classifications as the particles move along the belt. In one example, the control system 112 conducts a multi-discriminant analysis combining vision and sensing data for the particle to classify the particle.

The control system 112 and control unit 114 may be provided by a networked computer system employing a plurality of processors to achieve a high-speed, multi-tasking environment in which processing takes place continuously and simultaneously on a number of different processors. In the control system 112, each processor in turn is capable of providing a multi-tasking environment where a number of functionally different programs could be simultaneously active, sharing the processor on a priority and need basis. The choice of implementation of hardware to support the functions identified in the process groups may also depend upon the size and speed of the system, as well as upon the categories being sorted.

An image processing unit 192, or image processor 192, is provided in the control unit to periodically acquire and process the images. The image processor 192 includes logic for assembling each image from the camera. The image processor 192 may divide each image of the viewing area into a matrix of cells, and analyze the digital data corresponding to the image to determine locations of particles 104 on the conveyor 102 for use in the separator unit 128, and to determine or extract vision data for each particle 104 for use in the classification and sorting process. The image processor 192 receives signal indicative of the position of the conveyor 102 and when to acquire an image such that the conveyor belt is imaged in a series of sequential images of discretized sections of the conveyor as it passes through the viewing area. The control system 114 and image processor 192 of the control unit 112 may perform various analyses on each of the digital pixel values recorded for an image as described below.

The control system 112 may include a signal processing unit 190, or sensor processor 190, for example to quantize and digitize the signals from the array 110 for use by control unit 114 in classifying and sorting the particles 104. The sensor processor 190 may quantize and digitize the analog signal to maintain a predetermined resolution in the signal and data, for example, to tenths or hundredths of a volt, or may convert the analog signal to an 8-bit (or higher precision) value.

The control system 112 controls the sensing assembly 108 using information regarding the position of the conveyor 102, for example, using inputs from the position sensor 126, to determine the linear advancement of the conveyor belt 102 and the associated advancement of the scrap particles 104 on the belt. The control system 112 may control the sensor processor 190 and sensing assembly 108 to acquire sensor data when the conveyor belt 102 has advanced a predetermined distance and to correspond with vision data for a location on the belt 102 such that the same particles are being detected and analyzed by both systems 106, 108.

The control system 112 contains one or more data processing units 190, 192 to acquire and process the signals and data from the systems 106, 108. In one example, the data processing units 190, 192 are integrated with the control unit 114, and in other embodiments, the processing units are separate.

The sensor processor 190 for the sensor system 108 includes logic for assembling the data from each sensor into a representation of the belt 102. The sensor processor 190 may represent a transverse section of the belt as a matrix of cells, and analyze the sensor data to determine locations of particles 104 on the conveyor 102, and to determine an input for each particle 104 for use in the classification and sorting process. The sensor processor 190 receives a signal indicative of the position of the conveyor 102 and when to acquire sensor data such that the conveyor belt is "imaged" in a series of discretized sections of the conveyor 102 as it passes across the sensor assembly 108 and array 110 and creates a sensor data matrix that is a linescan image of the belt. The control system 112 and sensor processor 190 may perform various analyses on the sensor data matrix as described below, or otherwise manipulate the sensor data.

The control system 112 uses vision data and the sensing data, e.g. the quantized and digitized signals from the sensing assembly 108, to classify the particle 104 into one of two or more preselected classifications. Based on the classification outcome, the control system 112 controls the separator unit 128 to sort the particles 104 based on their associated classifications. The control system 112 may also include one or more display screens and a human machine interface 194, for use in controlling the system 100 during operation and also for use in calibration or system setup.

Figures 5, 6:
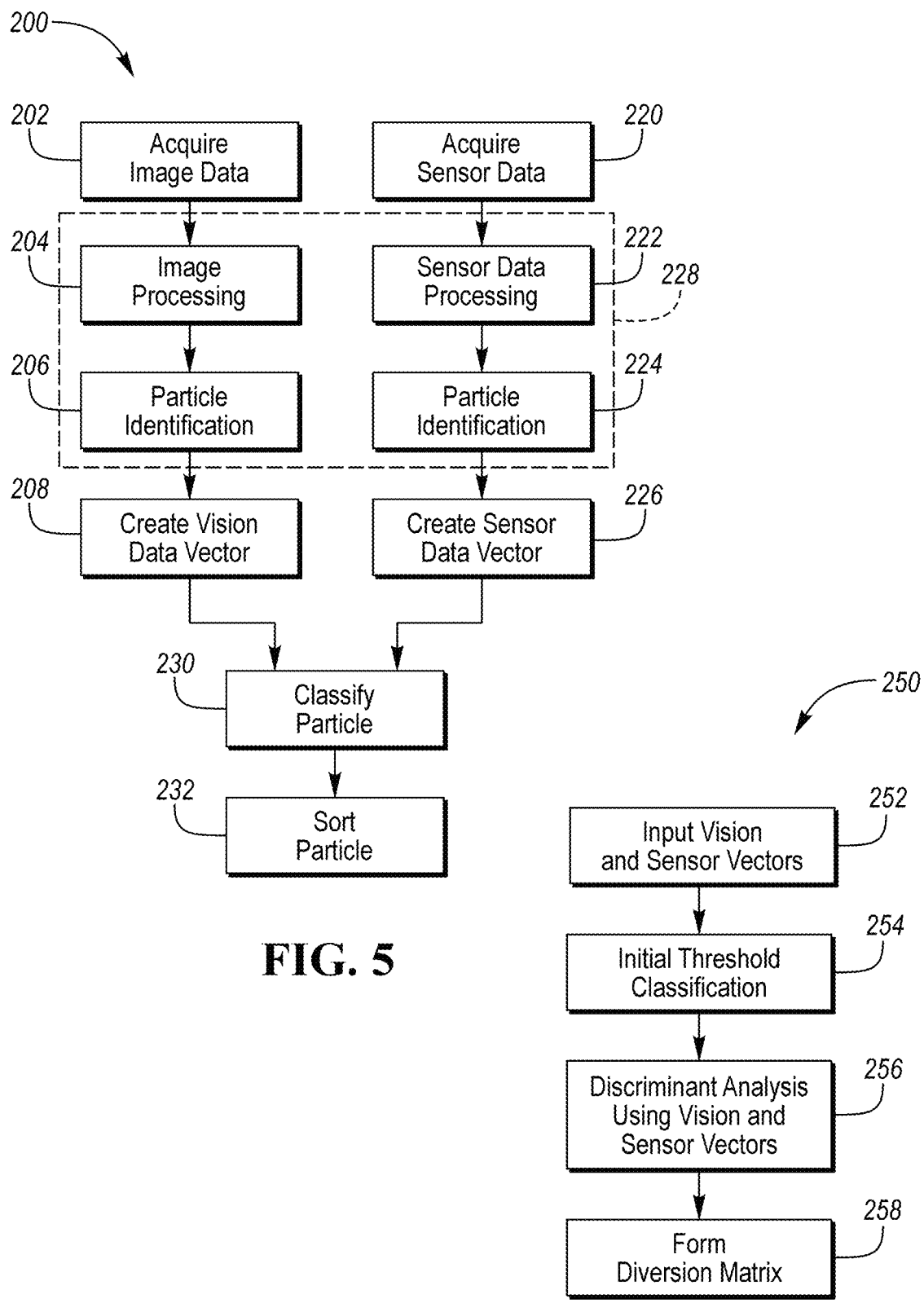
FIG. 5 illustrates a flow chart illustrating a method for classifying scrap material using the system of FIG. 1.
FIG. 6 illustrates a flow chart for a classification method for use with the method of FIG. 5.

FIG. 5 illustrates a method 200 for classifying particles 104 using the control system 112 of the system 100 as shown in FIGS. 1-4. In other embodiments, various steps in the method 200 may be combined, rearranged, or omitted.

At step 202, the control system 112 provides a line trigger signal to the camera 140 to acquire a single line based on the position of the conveyor 102. In response to receiving the line trigger signal, the camera 140 acquires a line scan image. The camera may be controlled to acquire multiple consecutive lines as the belt moves to create an image or frame of a region of the belt.

At 204, the control system 112 forms a first matrix, or image matrix associated with the line scan image that is also linked to the position or coordinates of the belt 102 for use by the separator unit 128 and for coordination with the sensing apparatus 108 and sensing data acquisition. At step 202, the image matrix overlays the image such that each cell in the matrix is associated with one or more pixels in the image. In one example, the image matrix may have a cell associated with each pixel. In other examples, the image matrix may have one cell associated with multiple adjacent pixels. The image matrix may be sized to correspond with the size of the sensor matrix as described below, for example, with the same aspect ratio.

The image processor 192 or control system 112 may use a matrix with cells and arrays of the matrix including [R, G, B] color channel data, and additional information regarding particle location, and particle properties as determined below. The image processor 192 or control system 112 may alternatively use an imaging library processing tool, such as MATROX, to create a table or other database populated with pixel data for each particle including [R, G, B] values, boundary information, and other particle properties as determined below.

Each image matrix may be formed using RGB signals corresponding to each of the red, green and blue segments or color components of the viewing area as detected by the sensor in the camera 140. In other examples, other color signals may be provided to the image processor 192 that are based on a different color space and color model to indicate a color for the image that includes at least three-color components or other channels may be provided from the camera, e.g. grayscale, non-visible spectra, and the like. The RGB signals from the camera 140 are assembled or converted by the image processor 192 to three arrays for each image matrix, with each array corresponding to one of the red, green, and blue images. The image processor 192 may assemble the line scan image data to form a larger, composite image matrix with the arrays. Each array may be 1024×2048 digital pixel values (from 0 to 255) for each of the red, green and blue images. The arrays may be overlaid to provide a color image with three channels, or RGB channels, for each pixel or for each cell in the image matrix. The RGB values are provided as a dataset of [R, G, B] values, each value ranging from 0 to 255, to the pixel or cell in the image matrix.

The image processor 192 may transform the image matrix using a fast Fourier transform (FFT), reject high frequency noise and/or reject specific frequencies in the X- and/or Y-directions representing belt pattern noise, and then apply an inverse FFT to restore the improved image matrix. The control system 112 is employed to reduce noise on the image by transforming the image via a FFT to create a representation of the image in a frequency domain, remove at least one specified frequency from the representation, and transforming the representation back to the image via an inverse FFT.

The control system 112 may additionally normalize each of the color channels for the image, e.g. the R image or array, the B image or array, and the G image or array for an RGB color space, to correct any spectral imbalances in the light sources. For example, each pixel in the image may have the R value, G value, and/or B value modified using look-up or calibration tables associated with each color. The calibration or look-up tables for the color correction of the image may be obtained based on a calibration process using a neutral background, a calibration card, or the like.

At 206, the control system 112 identifies cells in the image matrix or pixels in the image that may contain a particle 104 by distinguishing the particle from a background indicative of the conveyor 102. The particle 104 is distinguished from the background by applying a threshold on at least one channel of the image or matrix and flagging a pixel or cell when a value of the at least one channel exceeds the threshold to indicate the presence of a particle 104. The threshold used to distinguish the particle in the vision matrix may be based on the vision system and vision matrix, and/or the sensing system and corresponding sensor matrix described below.

As a part of the particle identification process, the control system 112 may conduct frame-to-frame stitching by stitching the image matrix between image matrices taken at the immediately preceding time and immediately subsequent time. By stitching the frames together, a larger continuous region of the belt may be analyzed by the control system 112 for particle identification and image data for the particles that are on the central image matrix. For example, three frames may be stitched together, with the image frame at time t1 stitched between an image frame from the preceding time t0 and an image frame from the next time t2. The images matrices, including the stitched matrices, may be temporarily stored in a data buffer in memory accessible by the control system 112. As particles may extend across more than one image matrix or frame, the use of stitching aids in particle identification and obtaining complete image data for a single particle on the belt.

At step 208, the control system 112 creates a vision data vector with information related to the belt position, an image pointer to the location and boundary of the identified particle on the image matrix, and any other image or vision data associated with the particle such as color inputs or the like. In one example, the control system 112 uses the stitched matrices to create the vision vector with reference to the image pointer and the central matrix or frame. The control system 112 additionally further analyzes the identified particle region to provide additional color data and/or image data and create a vision data vector for each identified particle region. The control system 112 may further process the region of the image or matrix associated with a particle 104 using various machine vision processing techniques to erode, dilate, fill holes, or otherwise modify or correct the region of the image or matrix associated with the identified particle 104.

The control system 112 and image processor 192 may calculate a color input for the identified particle, for example, using a color model based on color components for each pixel in the image or cell in the matrix associated with the particle. The control system 112 may apply color criteria to the pixels of the image or the cells of the matrix associated with the particle 104 to determine the color input for the particle. In other examples, the control system 112 may evaluate groups of pixels or cells of the image associated with the particle 104. For example, the control system 112 may analyze the frequency and/or distribution of color components in neighboring pixels or cells in determining an overall color input for the particle 104.

The control system 112 receives the color components from each pixel of the image or cell of the matrix associated with the particle, and each pixel of the image may have three or more color components, for example, the three RGB channels as described above. For each pixel of each identified particle 104, the control system 112 therefore obtains the color components, e.g. R,G,B; or H,S,V; or other color space bases such as those from multispectral camera data with more than 3 color components.

In one example, the control system 112 may average the R values for all pixels associated with the particle, the B values for all pixels associated with the particle, and the G values for all pixels associated with the particle, resulting in a color dataset for the particle with three scalar values, as $[R_{average}, B_{average}, G_{average}]$, for the vision vector. In other examples, the control system 112 may calculate average color component values for the particle based on another color model or space, such as HSV, etc. In another example, the control system 112 may create a histogram for each color component of the particle 104, such that there is an R histogram, a G histogram, and a B histogram for an identified particle region using a RGB color space, or a single histogram for the particle 104 with three sets of bins, with each set of bins associated with a different color component of the color space as separated into 8-bit, 16-bit, or otherwise sized bins. The control system 112 may normalize the histogram, for example using the pixel area of the particle. The resulting input to the vision vector is a dataset containing a number of scalar values based on the values associated with each bin. The control system 112 may additionally or alternatively employ a discriminant analysis to determine one or more color inputs or values for the vision vector.

The control system 112 may additionally calculate or determine other visual parameters for the particle for inclusion in the vision vector including: texture features, a color component standard deviation, a grayscale volume, an aspect ratio, dimensionless perimeter (perimeter divided by square root of area) or another visual characteristic of the identified particle from the image or matrix as a visual feature for the particle. Texture features may include rank, number of holes created by thresholding the particle or by subtracting one rank image from another, total hole area as a proportion of total area, largest hole area as a proportion of area, and Haralick texture features. The control system 112 may assign texture values to the particle by transforming the image via a fast Fourier transform (FFT). The average log-scaled magnitude in different frequency bands in the FFT magnitude image may be used as distinguishing texture features.

In a further example, the vision system 106 may incorporate three-dimensional vision components, for example, via the addition of a laser profiler or the like. The laser profiler adds an additional array of vision data to the image matrix. Various image parameters may be extracted from three-dimensional data frame and added to the image vector, for example, three-dimensional volume, slope, peak height, a difference between maximum and minimum heights, height ranking, and the like. For example, differences may be determined between cast material and wrought material using the three-dimensional data, e.g. cast material has a flatter profile than wrought material. In further examples, the three-dimensional vision component includes near-infrared vision data, and additional vision data such as scatter may be added as well as range and intensity.

At steps 220 and 222, the control system 112 acquires sensor data using signals obtained from the sensors in the array 110, and processes the signals to form a second matrix or sensor matrix. The control system 112 creates the sensor matrix using signals received by the sensors in the array 110 that represents the belt 102 in a similar manner to a linescan image. If the sensors are not arranged in a single line, the times at which data is acquired into a "line scan" are appropriately compensated according to each sensor's distance along the Y direction, i.e. the direction of particle travel or movement of the belt 102. The control system 112 and sensor processor 190 acquire and process the signals from the sensors in the array 110 and sensing assembly 108 to create the sensor matrix from a series of the linescan images. The sensor matrix is formed by a series of rows, with each row representing a narrow band of the belt that extends the width of the belt 102. Each row is divided into a number of cells, and the processing unit enters data from the sensors into the cells such that the matrix is a representation of the conveyor belt 102, e.g. the matrix represents discretized sections or locations of the conveyor 102 as it passes across the array 110.

As the control system 112 and sensor processor 190 receive the data from the sensors 170, the control system 112 and sensor processor 190 form a matrix or linescan image associated with sensor array 110 that is also linked to the position or coordinates of the belt 102 for use by the separator unit 128 as shown at 204. The sensor processor 190 receives data from the sensor array 110, with a signal from each sensor 170 in the array. The sensor processor 190 receives signals from the sensors, and based on the position of the belt 102, for example, as provided by a digital encoder, inputs data from selected sensors into cells in the matrix. The sensor matrix is acquired at a specified time to correspond to the same belt location as the image matrix, and may have a different size or resolution based on the number of sensors. In one example, the sensor matrix is 120×144 in size. The sensor matrix provides a representation of the belt 102, with each cell in the matrix associated with a sensor 170 in the array. In one example, the sensor matrix may have a line with a cell associated with each sensor in the array, with the cells ordered as the sensors are ordered transversely across the belt when projected to a common transverse axis. Therefore, adjacent cells in a line of the matrix may be associated with sensors 170 in different rows in the array.

The control system 112 and sensor processor 190 receive the digitized direct current voltage signal or quantized value from the analog inductive sensor 170. In one example, the quantized value may be an 8-bit greyscale value ranging between 0-255. The sensor 170 may output any value between 0-12, 0-11, 0-10 Volts or another range based on the sensor type, and based on the sensor voltage output, the processor assigns a corresponding bit value. In one example, zero Volts is equivalent to a quantized value of zero. In other examples, zero Volts is equivalent to a quantized value of 255. In other examples, the sensor processor 190 may use other quantized values, such as 4-bit, 16-bit, 32-bit, may directly use the voltage values, or the like. For example, a sensor 170 that is not sensing a conductive scrap particle has a voltage of 10 Volts, and a sensor sensing a metal particle, such as steel or stainless steel, may have a peak sensor voltage of approximately 2.5 Volts, although this may vary based on the thickness of the particle 104 over the sensor 170, whether the particle is traveling through the entire electromagnetic field of a sensor 170 or only a portion thereof, etc. The voltage values used in the second matrix may be truncated for simplicity to the tenth or hundredth of a volt. When an 8-bit classification value is used with the analog sensors, 10 volts may have a quantized value of 0, with zero Volts having a quantized value of 255, and a voltage of 2.5 Volts having an associated quantized value of 191.

The cells in the sensor matrix are populated with a peak voltage as measured by the sensor 170 within a time window or at a timestamp. In other examples, the sensor signal data may be post-processed to reduce noise, for example, by averaging, normalizing, or otherwise processing the data.

The sensor processor 190 and control system 112 may use a matrix with cells containing additional information regarding particle location, and particle properties as determined below. The processor and control unit 112 may alternatively use an imaging library processing tool, such as MATROX, to create a table or other database populated with signal data for each particle including quantized 8-bit voltage values, boundary information, and other particle properties as described below with respect to further embodiments.

At step 224, the control system 112 identifies cells in the second matrix that may contain a particle 104 by distinguishing the particle from background signals indicative of the conveyor 102. The particle 104 may be distinguished from the background when a group of adjacent cells have a similar value, or values within a range, to indicate the presence of a particle 104 or when a single cell is sufficiently different from the background, for example, by applying one or more thresholds to the sensor matrix. The control system 112 then groups these sensor matrix cells together and identifies them as a "grouping" indicative of a particle. The threshold used to distinguish a particle in the sensor matrix may be based on the sensor system and sensor matrix, and/or the vision system and corresponding vision matrix described above.

As a part of the particle identification process, the control system 112 may conduct frame-to-frame stitching by stitching the sensor matrix between sensor matrices taken at the immediately preceding time and immediately subsequent time, in a manner similar to that described above with respect to the images matrices. By stitching the sensor matrices together, a larger region of the belt may be analyzed by the control unit for particle identification and sensor data for the particles that are on the sensor matrix. In one example, the control system 112 uses the stitched matrices to create a sensor vector with reference to a sensor pointer to the central frame to provide information regarding particle location. The sensor matrices or stitched sensor matrices may be temporarily stored in a data buffer in memory accessible by the control system 112. As particles may extend across more than one sensor matrix, the use of frame stitching aids in particle identification and obtaining complete sensor data for a single particle on the belt.

At step 226, the control system 112 creates a sensor data vector for each identified particle region with information related to the belt position, a sensor pointer to the location and boundary of the identified particle on the image matrix, and any other sensor data associated with the particle such as voltage values or the like. The control unit may further process the region of the image or matrix associated with a particle 104 using various machine vision processing techniques to modify or correct the region of the matrix associated with the identified particle 104, or to identify parameters or sensing data associated with the particle as indicated below.

The sensor data vector contains information related to the belt position, the sensor matrix pointer, and any sensor data such as a peak voltage, an average voltage, a summation of the voltages within the region identified as the particle, a rate of change of voltage for a sensor for the particle, an average voltage, a sum of the voltages over the area associated with the particle region, an area ratio factor as determined using a particle area divided by a bounding box area, a compactness factor as determined as a function of the particle perimeter and the particle area, and the like. For example, the control system 112 incorporates a peak voltage from a cell associated with the grouping into the sensor data vector, for example, the highest or lowest cell voltage or quantized value in the grouping. In other examples, the control system 112 may provide a value to the sensor data vector for the identified particle region as a sum of all of the values in the particle region, an average of all of the cells, as an average of the peak voltages or quantized values from three cells in the particle region, an average of the peak voltages or quantized values from three contiguous cells, or the like. In further examples, the control system 112 may input calculated values for the particle into the sensor vector such as shape, size, aspect ratio, texture feature, voltage standard deviation, or another characteristic of the grouping or identified particle from the sensor data in the matrix as a secondary feature for the particle. Some secondary classification features, such as texture, may only be obtained with the use of sensors that are smaller than the particle sizing to provide increased resolution and the data required for this type of analysis.

Although the method 200 is described as having separate particle identification steps and matrix processing at 204, 206, 222, and 224, variations of the method 200 are also envisaged, as indicated by block 228. In one example, the method 200 identifies particles solely using the image matrix, and uses the image pointer to create a sensor pointer to a corresponding region in the sensor matrix, regardless of whether the sensors 170 have detected any particles in that region. In another example, the method 200 identifies particles solely using the sensor matrix, and uses the sensor pointer to create an image pointer to a corresponding region in the image matrix, regardless of whether the vision system 106 has detected any particles in that region. In a further example, the method 200 identifies particles using either the sensor matrix or the image matrix, such when a particle is identified in either the image matrix or the sensor matrix, an image pointer and a sensor pointer are created for that region in both matrices. In a further example, the method 200 identifies particles using both the sensor matrix and the image matrix, such an image pointer and a sensor pointer is created only when a particle is positively identified in both the image matrix or the sensor matrix.

Figure 10:
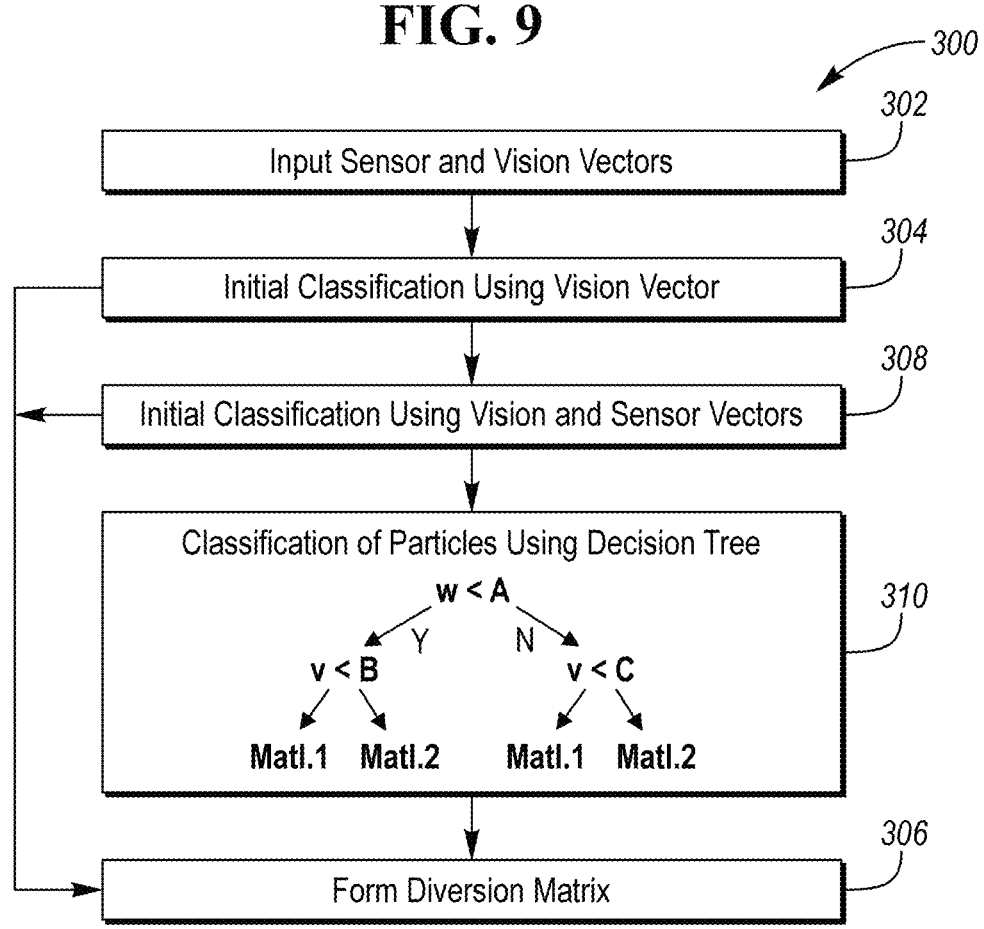
FIG. 10 illustrates a flow chart for another classification method for use with the method of FIG. 5.

At step 230, the control system 112 classifies the identified particle region using the data from both the vision and sensor vectors. The control system 112 may use a discriminant analysis technique to classify the particles. In one example, the control system 112 classifies the particle using a method as illustrated in FIG. 6 or FIG. 10, and as described below in greater detail.

In other examples, the control system 112 may classify the particle by inputting the vectors into a machine learning algorithm. The control unit may use a Support Vector Machine (SVM), a Partial Least Squares Discriminant Analysis (PLSDA), a neural network, a random forest of decision trees, a vector space model such as a bag-of-words model, or another machine learning and classification technique to evaluate the data vector and classify the particle 104. The control system 112 may alternatively use independent decisions from the vision data and sensor data, or vision and sensor vectors with a probabilistic combination of the two to determine a final classification. In one example, a neural network is used to classify each of the scrap particles 104 as one of a preselected list of materials based on the analysis of the image and sensor vectors. In other examples, the control system 112 may use a look-up table that plots the data vectors and then classifies the grouping based on one or more regions, thresholds, or cutoff planes. In one example, the classification of a particle 104 may be a multiple stage classification. Known algorithmic techniques such as back propagation and competitive learning, may also be applied to estimate the various parameters or weights for a given class of input and output data.

At step 232, the control system 112 controls the separator unit 128 to selectively activate an ejector 132 to eject a particle into a desired bin based on the classification for the particle. The control system 112 controls the ejectors 132 based on the classification of the particle 104, the position of the particle on the belt, and the position and timing of the conveyor 102.

According to an example, the system 100 is configured to sort particles 104 that are small in size and contain metals with higher value, such as copper, gold, or platinum, that may be mixed with other metal particles or provided as a coating. The particles 104 may have a largest dimension on the order of a centimeter or less. The particles 104 may be wetted prior to passing through the vision and sensing systems 106, 108, or may be provided as dry particles through the system 100. In one example, the control unit 112 may identify a particle 104 location on the belt 102 using information from both the sensor and image data.

In other examples, the sensor data is used to identify the location of a particle on the belt 102, as the vision image may have higher background noise. In a further example the sensing system 108 is positioned prior to the image system 106 such that the particle location as determined from the sensing system 108 may be used to determine the regions of the image data for analysis by the control unit 112 and image processing unit and reduce overall processing time. The control unit 112 classifies the particles 104 using the vision vector and the sensor vector. For example, the control unit may use the vision vector to aid in identification of gold or copper using color components such as [R, G, B] information in addition to the sensor data. In other examples, the control unit 112 may further use the sensor vector to aid in identification of light and heavy metals, for example, to classify particles between Aluminum or Titanium material.

Figure 7A:
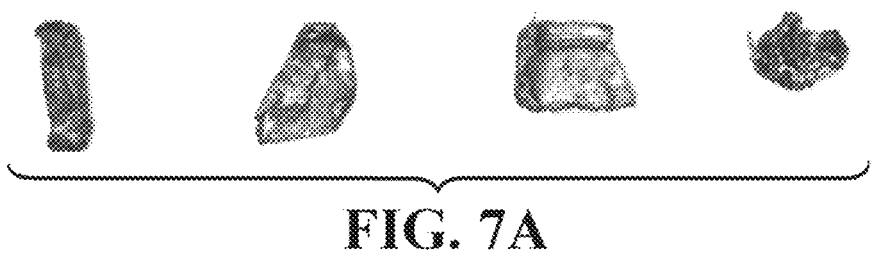
FIGS. 7A and 7B illustrate vision and sensor images for cast aluminum materials for use by the method of FIGS. 5 and 6 and obtained using the system of FIGS. 1-2.
Figure 7B:
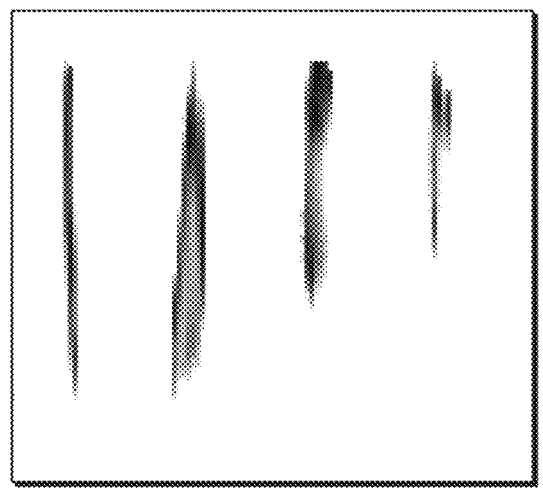
Figure 8A:
FIGS. 8A and 8B illustrate vision and sensor images for wrought aluminum materials for use by the method of FIGS. 5 and 6 and obtained using the system of FIGS. 1-2.
Figure 8B:
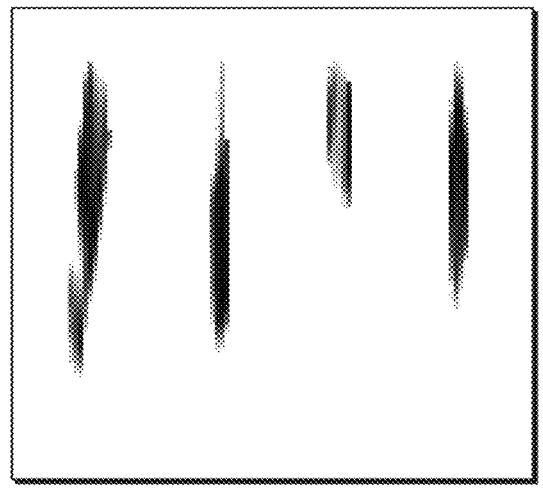
Figure 9:
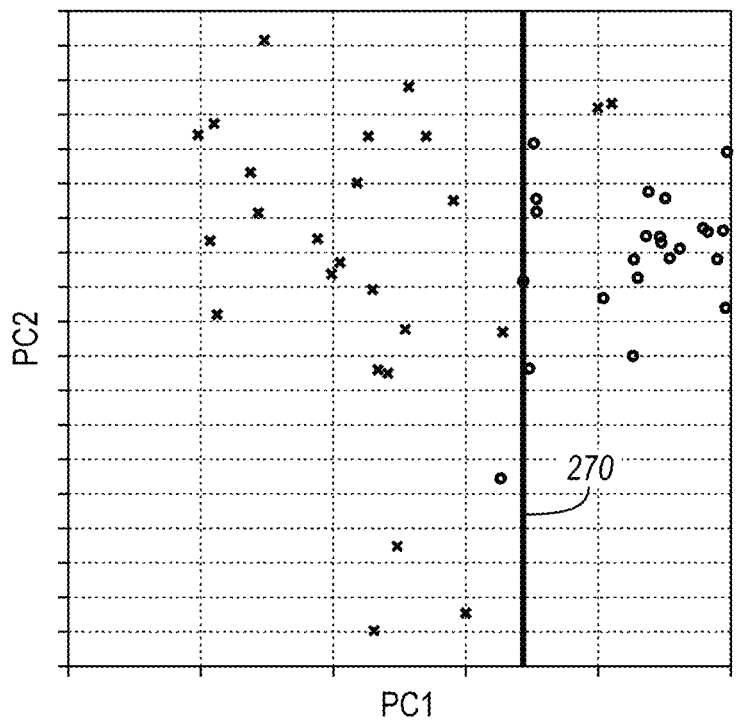
FIG. 9 is a plot of sample data for use in setting calibration and classification parameters.

FIG. 6 illustrates a flow chart for a method 250 of classifying a particle 104 according to an embodiment and for use by the control system 112 during step 230 of method 200 using the vision and sensor vectors as inputs, and FIGS. 7-9 provide examples of data and a classification step as used by the method 250. In other embodiments, various steps in the method 250 may be combined, rearranged, or omitted. With reference to the method 250, an example using cast and wrought aluminum and aluminum alloy materials is used by way of a non-limiting example, and one of ordinary skill in the art would understand how to apply the method 250 to classifying other groupings of materials. The vision vector and sensor vector are used as inputs to a discriminant analysis conducted by the control system 112 implementing method 250 to classify the scrap particles 104 as being cast aluminum or wrought aluminum.

FIG. 7A illustrates an image from the vision system 106 of four different particles formed from cast aluminum. FIG. 7B illustrates data from the sensing system 108 for the same four cast aluminum particles, and in the same order left-to-right.

FIG. 8A illustrates an image from the vision system 106 of four different particles formed from wrought aluminum. FIG. 7B illustrates data from the sensing system 108 for the same four wrought aluminum particles, and in the same order left-to-right.

Referring back to FIG. 6, at step 252, the control system 112 inputs the vision and sensor vectors into the classification method 250, for example, after analyzing one of the particles as shown in FIG. 7 or 8. The vision vector and the sensor vector according to the present example have a total of twelve parameters or scalar values, although other numbers of parameters are also contemplated in other embodiments. The vision vector for each particle may include: the vision pointer, red channel average, green channel average, blue channel average, a busyness score, a perimeter value, and at least one hole determination for each identified particle region, and other vision values. The busyness score is calculated by comparing a pixel or cell to its adjacent pixels or cells and determining a brightness and variation in intensity, with the busyness score being a normalized sum for the particle region. Generally, wrought material has a higher busyness score than cast material. The perimeter value may provide an indication of the compactness of the identified particle region and particle, and be calculated using the perimeter of the particle divided by an area factor, such as the square root of the particle area. The "hole" determination may be based on saturated pixels in the image and include at least one of the following from the matrix, image, or an enhanced contrast image: a value representing the number of holes or saturated pixels measured for the identified particle region, an area of the largest hole in the identified particle region normalized by the area of the identified particle, and a sum of the any hole areas in the identified particle region normalized by the area of the identified particle. Note that wrought materials tend to have more saturated pixels, or "holes", than cast material. Other vision values may include an area ratio to provide an indication of the compactness of the particle, e.g. the ratio of the actual area of the identified particle region normalized by an area of a bounding box about the same particle region. Note that cast materials tend to have a larger area ratio than wrought materials as they are more compact.

The sensor data vector for each particle may include the sensor pointer, an average voltage, a peak voltage, and an area ratio factor. In other examples, the sensor data vector may include additional values as described above. Note that cast materials tend to have a lower voltage output from the system 108, leading to a brighter appearance in the sensor image.

Additional values or inputs for the discriminant analysis may be provided by combining the sensor and vision vectors, with the control system 112 conducting further calculations and analyses based on the data. For example, the control system 112 may calculate an area ratio between the areas of the particle from the vision data and sensor data, respectively, and associate this with one of the sensor or vision vectors or in a combined vector with all of the data and parameters.

At step 254, an initial classification may be performed by the control system 112 to classify particles that easily are identified as being in one of the categories. For example, any non-metal materials may be easily identified in comparison to metal materials based on a comparison of the vision and sensing data. As non-metals lack conductivity, the vision vector would indicate a particle while the sensor vector would not indicate a particle. Additionally, particles with embedded metals may be easily identified and classified based on a comparison of vision and sensing data. Furthermore, some particles may easily be classified at this step by the control system 112 as being either cast or wrought based on the vision and/or sensor data and vectors. For example, a particle with a conductivity below a threshold value may be identified and classified as being cast material using the sensor vector, while any particles with a size or area greater than a specified threshold may be identified and classified as being wrought material using either the sensor or vision vectors. This step may also be used as a pre-filter using a pre-determined parameter such as aspect ratio or elongation.

At step 256, the control system 112 conducts a discriminant analysis using the vision vector and sensor vector for each region identified on the vision matrix or sensor matrix as a particle. The control system 112 may need to arbitrate when differing numbers of particles are identified between the vision and sensor matrices in the same corresponding areas of the matrices. For example, one matrix may indicate that there is one particle in a region and have an associated vector for that particle while the other matrix may indicate that there are two particles in the same corresponding belt region with two associated vectors. The control system 112 may arbitrate in this situation by summing, averaging, taking the peak value, or otherwise combining the two associated vectors from one matrix to provide values for comparison and use in the discriminant analysis with the other matrix.

In one example, the control system 112 creates a first discriminant and a second discriminant as determined using a principle component analysis. Each discriminant may be a linear combination as a function of the parameters from the sensor and vision vectors. For example, a first discriminant may be based on an equation such as aA+bB+cC+dD+ . . . , where a, b, c, and d are constant values and A, B, C, and D are parameters from each of the vision and sensor vectors. A second discriminant may be based on another equation such as mA+nB+oC+pD+ . . . , where m, n, o, and p are constant values and A, B, C, and D are parameters from each of the vision and sensor vectors. The first and second discriminants are used to separate and classify the particles into two or more classifications.

In one example, each of the discriminants are inputted as a pair into a lookup table or chart by the control system 112, and if the pair of discriminant is one of a series of predefined pairs, the particle is classified into a predetermined category of material. In another example, the control system 112 only uses a single discriminant as determined using a principle component analysis as described above, and the control system 112 inputs the discriminant into a lookup table or chart, and/or compares the single discriminant to a cutoff threshold. FIG. 7 illustrates an example of a lookup table according to an embodiment, and is described in further detail below.

The functions or primary component analyses used in determining the discriminants, the lookup tables and/or the cutoff thresholds may be determined during a calibration process using a known mixture of materials. The functions, parameters and threshold may be chosen to provide separation between cast and wrought materials with increased purity and recovery rates.

In further examples, additional discriminant analyses may be subsequently performed by the control system 112 using third and fourth discriminants, etc. to further refine the classification of the particle into two categories, or to classify the particle into a third, fourth or other category of material.

At step 258, a diversion matrix is created by the control system 112. The diversion matrix is used by the control system 112 during the sorting and separating step 232 in FIG. 5. In other examples, the control system 112 adds an additional array of diversion data to one of the image and sensor matrices for use in sorting and separating the particles.

The diversion matrix may be based on the central frames (pre-stitching) of the vision and sensing matrices. In one example, the diversion matrix is sized based on the resolution or number of the ejectors 132, and may be filled row by row, similar to a linescan image by the control system 112. The diversion matrix may have a set number of rows that are filled and cycle based on a shift register, first-in-first-out algorithm.

The diversion matrix may be filled by the control system 112 using a sorting value. The sorting value may be a binary value (0, 1) for a binary classification, or may be based on two-bit numbers, hexadecimal, or the like, for use in sorting of more than two classifications of particles 104.

In one example, the control system 112 assigns a sorting value based on the classification as determined at steps 254 and 256 to all of the cells in the diversion matrix that correspond to the entirety of an identified particle region, as determined using the vision pointer and/or the sensor pointer.

The combined vision and analog sensing system 100 provides significant improvements in the purity and recovery in sorted scrap materials. For example, by using the vision system 106 with the analog sensing system 108, sorting improvements are indicated for cast versus wrought materials. In a conventional vision-only system with a single-pass, wrought materials had 85% purity and 45% recovery, and cast materials had 49% purity and 88% recovery. In contrast, the system 100 according to the present disclosure operated with a single-pass and testing the same feed materials at the same linear belt speed provided wrought materials with 95% purity and 50% recovery, and cast materials with 56% purity and 96% recovery.

FIG. 9 is a plot of sample data for use is setting calibration and classification parameters based on results obtained during experimental testing. FIG. 9 illustrates sample calibration data from the system 100 that included cast and wrought aluminum materials. The wrought material may include sheet material. For each particle 104, the first and second discriminants are plotted as pairs of data (PC1, PC2), with the first discriminant (PC1) on the x-axis and second discriminant (PC2) on the y-axis. As can be seen from the Figure, a cutoff threshold may be selected as line 270, such that materials on one side of the threshold 270 are classified as cast and materials on the other side of the threshold may be classified as wrought or other. In a further example, particles that are within a specified range of the threshold may be assigned an indeterminate classification to further increase purities.

FIG. 10 illustrates a flow chart for a method 300 of classifying a particle 104 according to an embodiment and for use by the control system 112 during step 230 of method 200 using the vision and sensor vectors as inputs. In other embodiments, various steps in the method 300 may be combined, rearranged, or omitted. With reference to the method 300, an example using mixed materials is used by way of a non-limiting example, and one of ordinary skill in the art would understand how to apply the method 300 to classifying other groupings of materials. The mixed materials include a mixture of "bare" metals, including painted or coated metals, and metals that are embedded or encapsulated in non-metal materials. In one example, the mixed materials include metal wire that is coated with a layer of insulation, portions of circuit boards and other electronic waste, scrap materials from tire with metal belt embedded in rubber, and other metals that are at least partially entrapped, encapsulated, or embedded within insulation, rubber, plastics, or other nonconductive materials. The mixed materials 104 may be provided as nonferrous materials that contain other metal and metal alloys. The particles 104 may be wetted prior to passing through the vision and sensing systems 106, 108, or may be provided as dry particles through the system 100. The vision vector and sensor vector are used as inputs to a lookup table conducted by the control system 112 implementing method 300 to classify the scrap particles 104 for a binary sort, tertiary sort, etc.

At step 302, the control unit inputs the vision and sensor vectors. At step 304, the control unit 112 conducts an initial threshold classification using the vision vector. The vision vector may contain data such as [R, G, B] values for each pixel in a region identified as containing a particle 104, as well as the vision pointer, and other shape features, such as a width factor. The width factor may be an average minimum width for the particle 104, or another value associated with width. The control unit 112 may use various techniques to determine at step 304 if the particle falls within a first classification of materials, such as a circuit board.

Figure 11:
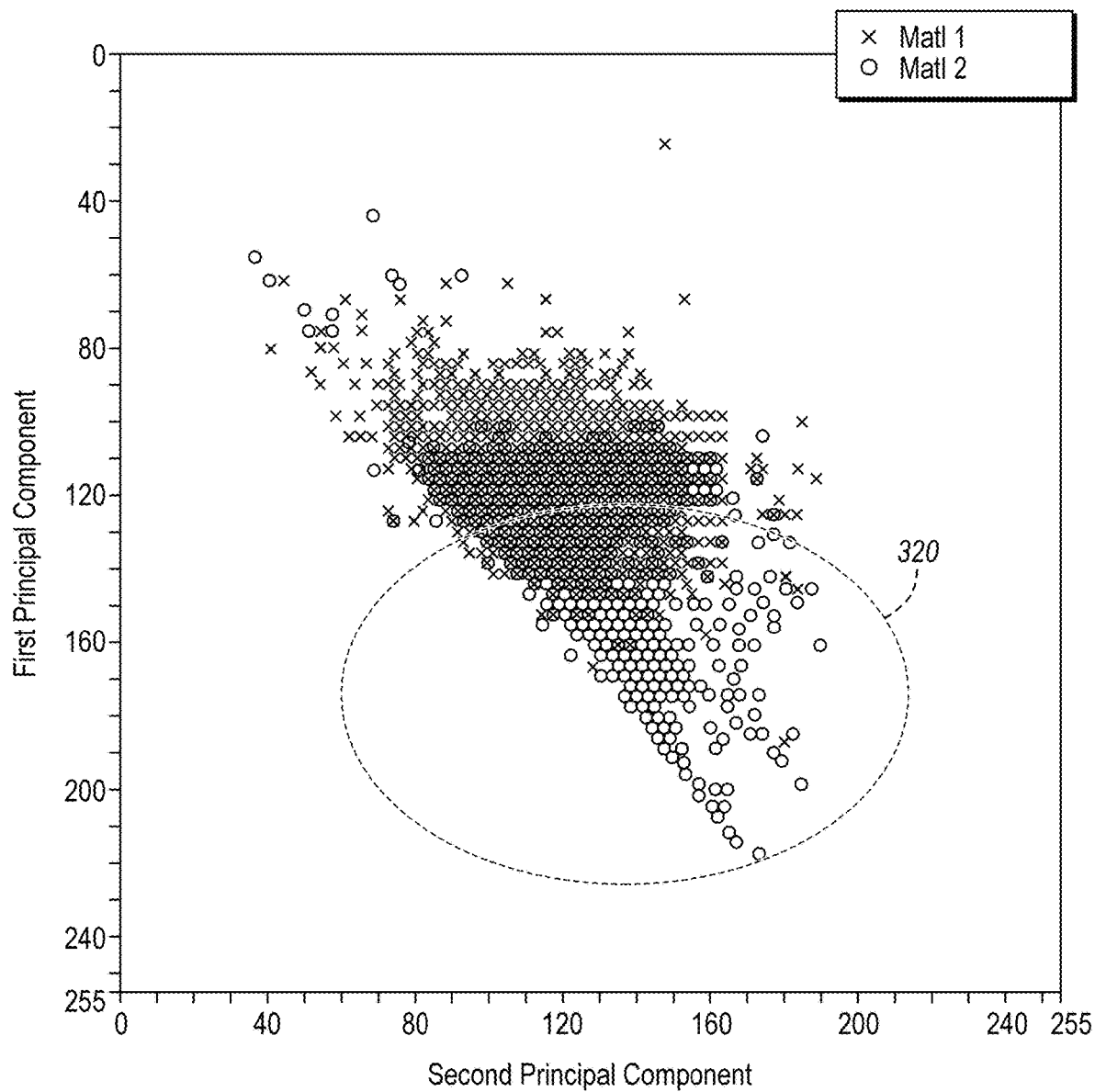
FIG. 11 illustrates zoning of the principal component space for the creation of a look-up table for use with the classification method of FIG. 10.

For example, the control unit 112 may classify the particle using a histogram analysis. In another example, the control unit 112 uses a multi-discriminant analysis to reduce the three (or more) color components to two color components as a pair of discriminants. The control unit 112 then inputs the pair of discriminants for each pixel or cell associated with the particle into a calibration table or chart stored in a memory unit associated with the control unit. An example of a calibration table is illustrated in FIG. 11, and may be non-linear as shown by region 320. If the pair of discriminants is one of a series of predefined pairs of discriminants and falls within region 320, as determined via a calibration process, the control unit 112 flags the pixel or cell in the image, for example, with a 1 value. If the pair of discriminants is not one of the series of predefined pairs of discriminants such that it falls outside of region 320, the control unit 112 leaves the pixel or cell in the image unflagged, for example, as a 0 value. The control unit 112 calculates a color input for the particle 104 based on the number of flagged pixels or cells, for example, by determining a fill fraction for the particle 104 by normalizing or dividing the summation of the flagged pixels by the total number of pixels associated with the particle. The control unit may then conduct an initial classification by comparing the color input or fill fraction to a threshold value. For example, the control unit 112 may classify a scrap particle as being circuit board during this step.

The control unit 112 may provide classification data to a diversion matrix at block 306, with the diversion matrix structured similarly to that described above with respect to FIG. 6.

At step 308, the control unit 112 conducts another initial classification step using data from both the vision and sensor vectors, and continues to populate the diversion matrix as appropriate. The control unit 112 continues to analyze the vision and sensor vectors to further classify mixed material particles on the belt 104 that were not identified and classified at step 304. For example, for particles identified only in the vision vector and being without a corresponding identified region in the sensor vector, the control unit may fill the diversion matrix at block 306 with a classification of non-metal materials.

At step 310, the control unit 112 classifies the particles on the belt identified in both the vision and sensor vectors, and populates the diversion matrix accordingly. In one example, the control unit 112 implements a decision tree classification technique. The control unit 112 may use value as determined from the sensor and vision vectors in comparison with various threshold values to classify the particle into one or more categories of material. An example of a decision tree for use in step 310 is illustrated in the Figure, and the decision tree may be changed based on the associated classifications of materials and mixture of scrap materials for sorting. The control unit 112 compares a first value, w, from the vision vector, such as a shape or width factor, to a threshold value, A. If the value is less than the threshold A, the control unit 112 then compares a second value, v, from the sensor vector, such as a peak voltage or average voltage, to a threshold value B, and then classifies the particle into a first or second category of material, such as metal or wire, respectively. If the value is greater than the threshold A, the control unit 112 then compares the second value, v, from the sensor vector, such as a peak voltage or average voltage, to a threshold value C, and then classifies the particle into a first or second category of material, such as metal or wire, or into another category of material. Of course, in other examples, other values may be used from the vision and sensor vectors, more than two values may be used in the decision tree, and the decision tree may be structured in another manner.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of sorting scrap particles comprising:
    imaging a moving conveyor containing scrap particles using a vision system to create a vision image corresponding to a timed location of the conveyor;
    employing a control system to analyze the vision image as a vision matrix of cells, identify cells in the vision matrix containing a particle, and generate a vision vector containing vision data from the vision matrix for the particle;
    sensing scrap particles contained on the moving conveyor using a sensing system to create a sensing matrix corresponding to the timed location of the conveyor, the sensing system having at least one array of analog proximity sensors;
    employing the control system to analyze the sensing matrix, identify cells in the sensing matrix containing a particle, and generate a sensing data vector containing sensing data from the sensing matrix for the particle; and
    employing the control system to classify the particle into one of at least two classifications of a material as a function of the vision data vector and the sensing data vector by inputting the vectors into a machine learning algorithm.

2. The method of claim 1 wherein the control system is employed to stitch the vision image with a preceding vision image and a subsequent vision image prior to analyzing the vision image.

3. The method of claim 1 wherein the control system is employed to stitch the sensing matrix with a preceding sensing matrix and a subsequent sensing matrix prior to analyzing the sensing matrix.

4. The method of claim 1 further comprising employing the control system to quantize an analog signal from each of the sensors in the at least one array while maintaining a predetermined resolution from the analog signal; and
    wherein each sensor in the array of sensors is positioned at a first distance away from the conveyor.

5. The method of claim 1 wherein the vision data vector contains a vision pointer and at least one of the following: at least one color input, a busyness score, a perimeter value, at least one hole determination, and an area ratio.

6. The method of claim 1 further comprising employing the control system to calculate another value for one of the vision and sensor vectors, the another value calculated from vision and sensor data for the same particle.

7. The method of claim 1 wherein the control system is further employed to arbitrate the sensor and vision vectors in response to the sensor and vision matrices indicating a differing number of particles over the same corresponding area between the matrices.

8. The method of claim 1 wherein the machine learning algorithm comprises at least one of a support vector machine, a partial least squares discriminant analysis, a neural network, a partial least squares discriminant analysis, a random forest of decision trees.

9. The method of claim 1 wherein the control system is employed to identify and analyze particles in the vision image using a location as determined from the sensing matrix.

10. The method of claim 1 further comprising sorting the particle by controlling a separator device based on the classification for the particle and the timed location of the conveyor.

11. A method of sorting scrap particles comprising:
    imaging a moving conveyor containing scrap particles using a vision system to create a vision image corresponding to a timed location of the conveyor;
    employing a control system to analyze the vision image as a vision matrix of cells, identify cells in the vision matrix containing a particle, and generate a vision vector containing vision data from the vision matrix for the particle;
    sensing scrap particles contained on the moving conveyor using a sensing system to create a sensing matrix corresponding to the timed location of the conveyor, the sensing system having at least one array of analog proximity sensors;
    employing the control system to analyze the sensing matrix, identify cells in the sensing matrix containing a particle, and generate a sensing data vector containing sensing data from the sensing matrix for the particle; and
    employing the control system to classify the particle into one of at least two classifications of a material as a function of the vision data vector and the sensing data vector;
    wherein the sensing data vector contains a sensor pointer and at least one of the following: a peak voltage, a rate of change of voltage, an average voltage, a summation of the voltages over a particle area, an area ratio factor, and a compactness factor.

12. The method of claim 11 wherein the control system classifies the particle as the function of the vision data vector and the sensing data vector using a principal component analysis with at least one discriminant as a function of the vision data and sensor data.

13. The method of claim 11 wherein the control system classifies the particle as the function of the vision data vector and the sensing data vector using a decision tree and at least one value from each of the vision data vector and the sensing data vector.

14. The method of claim 11 further comprising calculating a color input for the particle from a color model by determining color components for each cell in the vision matrix associated with the particle, the color input calculated by inputting two color components from each cell of the matrix associated with the particle as a pair of discriminants into a calibration table, flagging the cell if the pair of discriminants is one of a predefined pair of discriminants, and calculating the color input by normalizing a summation of the flagged cells by a total number of cells associated with the particle.

15. The method of claim 14 further comprising employing the control system to pre-classify the particle using the color input prior to classifying the particle as the function of the vision data vector and the sensing data vector.

16. A system for sorting randomly positioned scrap material particles on a moving conveyor, the system comprising:
a vision system having an imaging sensor and an illuminated predefined viewing area to image a conveyor passing therethrough at a time interval;
a sensing system having an array of analog inductive proximity sensors arranged in a single common plane arranged generally parallel to the conveyor and positioned to sense scrap particles on the conveyor; and
a control system configured to receive and process image data acquired from the vision system to identify a scrap particle on the conveyor in the viewing area, analyze the vision data for the particle to form a vision data vector, receive and process sensor data acquired from the sensing system and timed to correspond with the vision data to identify the scrap particle on the conveyor, analyze the sensor data for the particle to form a sensor data vector, and classify the particle into a classification of material using the vision data vector and the sensing data vector;
wherein the vision data vector comprises a vision pointer, and at least one of the following: at least one color input, a busyness score, a perimeter value, at least one hole determination, and an area ratio; and
wherein the sensor data vector comprises a sensor pointer and at least one of the following: a peak voltage, a rate of change of voltage, an average voltage, a summation of the voltages over a particle area, an area ratio factor, and a compactness factor.

17. The system of claim 16 further comprising a sorting system configured to sort the particle on the conveyor in response to receiving the classification from the control system.

18. The system of claim 16 wherein the vision system is positioned subsequent to the sensing system along the conveyor.

19. A method of sorting scrap particles comprising:
imaging a moving conveyor containing scrap particles using a vision system to create a vision image corresponding to a timed location of the conveyor;
employing a control system to analyze the vision image as a vision matrix of cells, identify cells in the vision matrix containing a particle, and generate a vision vector containing vision data from the vision matrix for the particle;
sensing scrap particles contained on the moving conveyor using a sensing system to create a sensing matrix corresponding to the timed location of the conveyor, the sensing system having at least one array of analog proximity sensors;
employing the control system to analyze the sensing matrix, identify cells in the sensing matrix containing a particle, and generate a sensing data vector containing sensing data from the sensing matrix for the particle;
employing the control system to classify the particle into one of at least two classifications of a material as a function of the vision data vector and the sensing data vector; and
employing the control system to arbitrate the sensor and vision vectors in response to the sensor and vision matrices indicating a differing number of particles over the same corresponding area between the matrices.

20. A method of sorting scrap particles comprising:
imaging a moving conveyor containing scrap particles using a vision system to create a vision image corresponding to a timed location of the conveyor;
employing a control system to analyze the vision image as a vision matrix of cells, identify cells in the vision matrix containing a particle, and generate a vision vector containing vision data from the vision matrix for the particle;
sensing scrap particles contained on the moving conveyor using a sensing system to create a sensing matrix corresponding to the timed location of the conveyor, the sensing system having at least one array of analog proximity sensors;
employing the control system to analyze the sensing matrix, identify cells in the sensing matrix containing a particle, and generate a sensing data vector containing sensing data from the sensing matrix for the particle; and
employing the control system to classify the particle into one of at least two classifications of a material as a function of the vision data vector and the sensing data vector;
wherein the control system is employed to identify and analyze particles in the vision image using a location as determined from the sensing matrix.

* * * * *

UNITED STATES PATENT AND TRADEMARK OFFICE
CERTIFICATE OF CORRECTION

PATENT NO. : 10,898,928 B2  
APPLICATION NO. : 15/936923  
DATED : January 26, 2021  
INVENTOR(S) : Kalyani Chaganti et al.

Page 1 of 1

It is certified that error appears in the above-identified patent and that said Letters Patent is hereby corrected as shown below:

Column 24, Line 17, Claim 8:  
After "a neural network"  
Delete "a least partial squares discriminant analysis" (second occurrence).

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*